United States Patent
Hundebøl

Patent Number: 5,707,444
Date of Patent: Jan. 13, 1998

[54] METHOD FOR CONTROLLING THE TEMPERATURE IN A KILN

[75] Inventor: Søren Hundebøl, Copenhagen, Denmark

[73] Assignee: F. L. Smidth & Co. A/S, Denmark

[21] Appl. No.: 716,400

[22] PCT Filed: Apr. 18, 1995

[86] PCT No.: PCT/DK95/00160

§ 371 Date: Sep. 20, 1996

§ 102(e) Date: Sep. 20, 1996

[87] PCT Pub. No.: WO95/29138

PCT Pub. Date: Nov. 2, 1995

[30] Foreign Application Priority Data

Apr. 21, 1994 [DK] Denmark ................... 459/94

[51] Int. Cl.⁶ ....................................... F27B 7/00
[52] U.S. Cl. .................. 106/739; 106/743; 106/762; 432/37; 432/103; 110/190; 73/23.2; 73/23.31; 205/785.5; 205/786.5
[58] Field of Search ................... 106/739, 743, 106/762; 431/66; 432/37, 103; 110/190, 226, 275, 345; 73/23.2, 23.25, 23.31; 205/785.5, 786.5

[56] References Cited

U.S. PATENT DOCUMENTS

| | | | |
|---|---|---|---|
| 3,578,299 | 5/1971 | Hurlburt | 432/37 |
| 4,111,554 | 9/1978 | Colin et al. | 356/36 |
| 4,738,147 | 4/1988 | Tomlin | 55/97 |
| 5,596,154 | 1/1997 | Baughman | 73/23.31 |

FOREIGN PATENT DOCUMENTS

| | | | |
|---|---|---|---|
| 2039308 | 2/1972 | Germany | 106/743 |
| 0586141 | 12/1977 | U.S.S.R. | 106/743 |

*Primary Examiner*—Paul Marcantoni
*Attorney, Agent, or Firm*—Brumbaugh, Graves, Donohue & Raymond

[57] ABSTRACT

A method and apparatus for controlling the temperature in a kiln in which cement clinker is manufactured. The temperature is controlled by controlling the fuel rate to the kiln. The fuel rate is adjusted according to a calculation that is made of the sulphur evaporation in the kiln, thereby obtaining a measure of the instantaneous temperature in the burning zone. The evaporation factor is calculated on the basis of measurements of the sulphur content in the cyclone material which passes to the kiln or a measurement of the sulphur content in the exit gases out of the kiln.

9 Claims, 1 Drawing Sheet

METHOD FOR CONTROLLING THE TEMPERATURE IN A KILN

BACKGROUND OF THE INVENTION

The present invention relates to a method for controlling the temperature in a kiln for manufacturing cement clinker.

It is common knowledge that cement is manufactured by a number of raw materials, particularly lime ($CaCO_3$), clay, sand, pyrite ash, fly ash and other materials being mixed and interground into a raw meal in which the content of the oxides $CaO$, $SiO_2$, $Al_2O_3$, $Fe_2O_3$ must be specifically adapted within relatively narrow boundaries. The raw meal is subsequently preheated and calcined, during which process $H_2O$ and $CO_2$ are driven off. A range of reactions will then occur between the oxides, first and foremost the following reactions:

$$2\ CaO + SiO_2 \rightarrow (CaO)_2(SiO_2)\ \text{(belite)}\ (CaO)_2(SiO_2) + CaO \rightarrow (CaO)_3(SiO_2)\ \text{(alite)}$$

These reactions between solid substances take place in a molten mass, with the aluminium and iron oxides which are necessary for forming the molten mass.

For every burning process the overall objective is always to ensure that the sufficient amount of alite is formed and that, simultaneously, the volume of free, not yet consumed $CaO$ is reduced to an acceptably low level. Traditionally the burning process takes place in a rotary kiln and the final reaction occurs in the burning zone of the rotary kiln, with the reaction process being controlled by a regulation of the temperature by adjusting the firing rate and the flame setting. The temperature during the burning process approaches the 1400°–1450° C. range for the common types of clinker.

Accordingly, it will be necessary to perform a measurement providing continuous indication of the temperature in the kiln, hence indicating also the composition and quality of the clinker, but so far it has not been possible to measure the interesting temperature directly.

Thermocouples (Pt-PtRh) are impossible to install in a manner ensuring that they are not destroyed within a short period of time as a result of the contact with the hard clinker.

Radiation pyrometers can be used, but only if there is good visibility in the burning zone, which is rarely the case since a certain dust load will inevitably be generated during the burning process.

An indirect signal, which is extensively used to indicate the temperature, is a measurement of the force which is used to rotate the kiln. The reason why this signal can be used is that the higher the temperature of the clinker, the greater the amount of molten mass being formed, hence causing more of the charge to be drawn higher upwards along the side of the rotary kiln during rotation. As a result, the moment of force (force x arm) will be increased, hence increasing also the power required to rotate the kiln. However, the moment of force is a relative signal which is affected by a multitude of factors: arbitrary skewness in the crust formation, the adhesive properties of the raw materials along the entire length of kiln etc. Consequently, it is impossible to indicate exactly what the moment should be to ensure sufficient burning.

Another method for measuring the temperature in the burning zone involves measurement of the $NO_x$-emission from the kiln. The $NO_x$ formation in the burning zone relates specifically to the temperature level in the flame, and it is influenced, at constant production and unaltered burner setting, only by the surplus air required for the burning process, and, since the overall aim is to keep the surplus air constant, the $NO_x$ emission is a direct measure of the burning temperature. As it is, kilns have been operating for many years on the basis of $NO_x$-measurements, being controlled both manually and automatically, e.g. by means of Fuzzy logic.

However, it is a recognized fact that the emission of $NO_x$ is detrimental to the environment, and, therefore, many efforts are mainly concentrated on reducing the emission of $NO_x$, including the emission of the rotary kiln, of a cement kiln plant.

These measures severely reduce the possibilities of controlling the kiln. This is best understood by considering a curve of the $NO_x$ formation as a function of the temperature T (° C.) (see FIG. 1). The curve is found by measuring the $NO_x$ formation as a function of the final temperature of the clinker subject to a specific flame setting.

When burning common clinker, one has an operating point which is situated in much the same position as A. Here the formed $NO_x$ is essentially of thermal origin, i.e. the nitrogen atom in $NO_x$ originates from the $N_2$ of the air, and high/low deviations from the target temperature are markedly reflected in a significant change in the amount of formed $NO_x$.

When measures are introduced to reduce the $NO_x$ level, corresponding to a lower temperature in the kiln, one will approach the operating point B, where the formed $NO_x$ originates mainly from the fuel. In the proximity of point B, temperature dependence of the $NO_x$ formation is negligible and, in actual practice, the $NO_x$ measurement cannot be used as a control parameter in such a low-$NO_x$ operating mode.

In addition to lowering the $NO_x$ emission, energy savings are also achieved when the flame temperature is lowered, which makes these conditions particularly desirable during the operation of the kiln.

In order to obtain operating conditions with a low degree of $NO_x$ emission, the option of extending the flame in the kiln may be used, for example by reducing the primary airflow or primary velocity of the burner. By this method the clinker will have a lower final temperature, but, on the other hand, the clinker requires a longer retention time at temperatures above the minimum limit where the alite formation may take place.

Another method for obtaining operating conditions with a low degree of $NO_x$ emission and a lower necessary flame temperature involves addition of a mineralizer to the raw meal, thereby lowering the temperature required for the alite formation to take place. Addition of sulphur and fluoride involves, for example, that the clinker burning process may occur at a temperature which is approximately 125° lower than normal, i.e. at 1275°–1325° C.

SUMMARY OF THE INVENTION

So, the objective of the invention is to ensure capability of controlling the temperature in the kiln, and hence the manufacture of the clinker which is produced in the cement kiln, achieving, simultaneously, a reduction of the $NO_x$ emission from kiln to an absolute minimum.

This is obtained by a method according to the invention where the sulphur evaporation in the kiln is calculated, thereby obtaining a measure of the instantaneous temperature in the burning zone.

BRIEF DESCRIPTION OF THE DRAWINGS

The invention is described in further details in the following with reference being made to the drawings, where.

DESCRIPTION OF THE PREFERRED EMBODIMENTS

Here, evaporation is used to designate the decomposition reactions which basically occur at temperatures above 1100° C.:

$$CaSO_4 \rightarrow CaO + SO_2 + \tfrac{1}{2} O_2 \quad K_2SO_4 \rightarrow K_2O + SO_2 + \tfrac{1}{2} O_2$$

Figure 1:
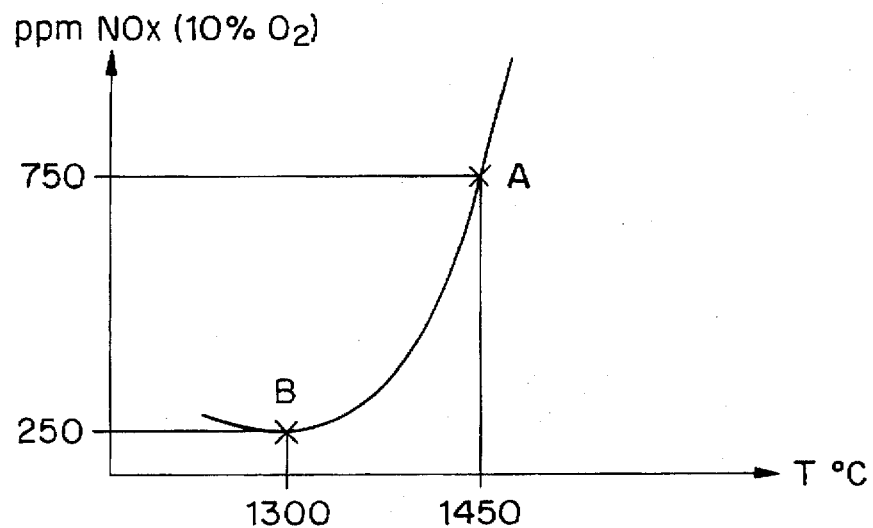
FIG. 1 shows the amount of formed $NO_x$ as a function of the temperature.
Figure 2:
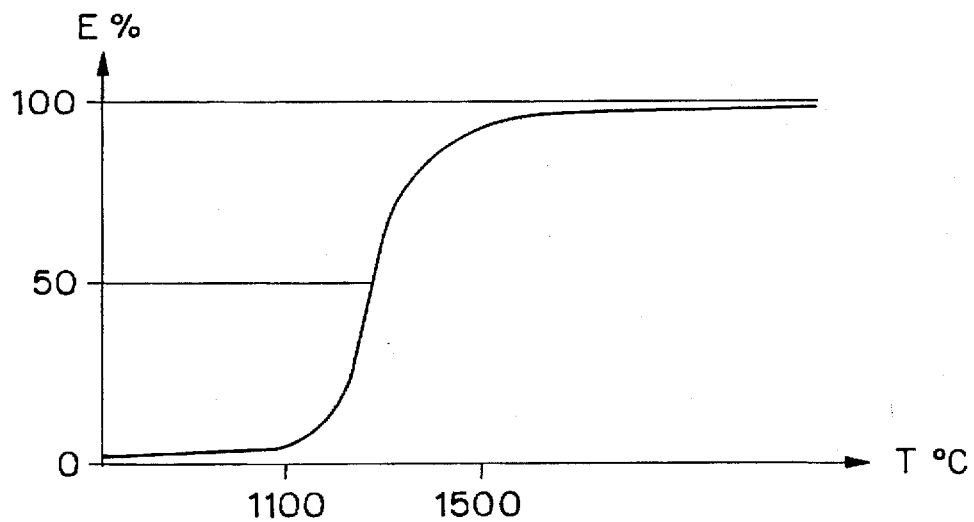
FIG. 2 shows the evaporation factor E as a function of the temperature.

The evaporation factor E is defined as the fraction of the sulphur S which is fed to the burning zone of the kiln together with the calcined raw materials, and which is subject to evaporation. This factor is very interesting because it increases substantially when the temperature is lying within the range 1100°–1500° C. (see FIG. 2) and because this very temperature range is used for the clinker burning process.

Figure 3:
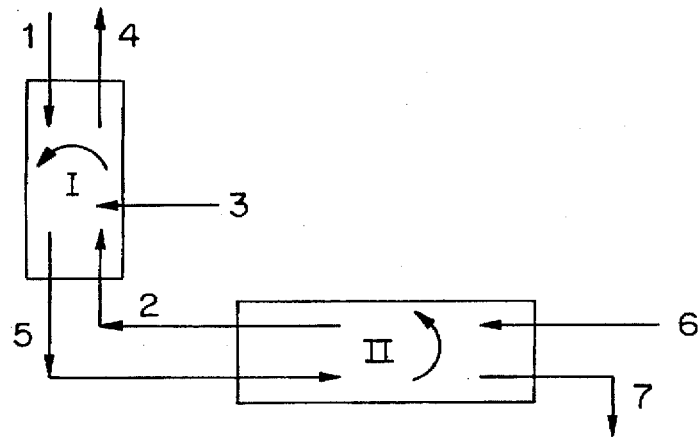
FIG. 3 shows an elementary sketch of the mass flow in a plant for manufacturing cement.

An expression of the evaporation factor E can be found by making two mass balances for a plant for manufacturing cement clinker (see FIG. 3).

Such a plant consists of a system I where the raw materials are being prepared for burning, and a system II in which burning is taking place. System I may advantageously incorporate a cyclone preheater and possibly a calciner, and system II may advantageously incorporate a rotary kiln.

The sulphur content of the different flows, i.e. the amount of sulphur $S_x$ that passes in and out of the two systems I and II, can be measured as kg sulphur/hour or as kg sulphur/kg clinker produced at the plant.

Raw materials 1 with a sulphur content $S_{feed}$ and exit gases 2 from the rotary kiln with a sulphur content $S_{kiln\ gas}$ gas are fed to system I.

Sulphur, $S_{sec.fuel}$, may also be supplied at 3, via secondary fuel to calciner or riser duct.

A flow of cooled exit gases 4 with a sulphur content $S_{exit\ gas}$ is discharged from system I, and the precalcined or merely preheated material flows at 5, normally from a cyclone, down into the kiln with the sulphur content $S_{cyc}$.

The input flows to system II consist of the preheated or precalcined material $S_{cyc}$ 5 and kiln fuel 6, i.e. primary fuel, with the sulphur content $S_{prim.fuel}$. The output flows consist of the exit gases $S_{kiln\ gas}$ 2 from the kiln and of the finished clinker 7 with the sulphur content $S_{clink}$.

The evaporation factor E represents, at any particular time, the ratio between the amount of sulphur which evaporates in the burning zone and the amount of solid, combined sulphur which passes into the burning zone. However, the possibility of measuring the sulphur content of these two interesting flows in the burning zone does not exist.

Still, the situation will be such that the amount of sulphur which evaporates in the burning zone will approximately be equal to the amount of sulphur that passes out of the kiln at 2, $S_{kiln\ gas}$, minus the contribution coming from the primary fuel, $S_{prim.fuel}$, and the amount of solid, combined sulphur which passes into the burning zone will approximately be equal to the amount which passes down from system I at 5, $S_{cyc}$. This involves that:

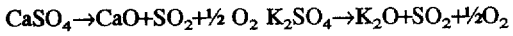

$$E \approx \frac{S_{kiln\ gas} - S_{prim.fuel}}{S_{cyc}}$$

The sulphur content in the primary fuel will be constant for a specific type of fuel and, therefore, the $S_{prim.fuel}$ is known if the fuel consumption during the time period t is known. $S_{cyc}$ will vary with the time period because of fluctuations in the sulphur input to the burning zone and variations in the temperature in the burning zone. In a rotary kiln where the passage of the material from the inlet of the kiln where $S_{cyc}$ is measured and to the burning zone may take a relatively long time, one has to apply a time delay $\tau$ to the measurements, in relation to the measurement of $S_{kiln\ gas}$, which happens almost instantaneously, which means that:

$$E(t) \approx \frac{S_{kiln\ gas}(t) - S_{prim.fuel}(t)}{S_{cyc}(t-\tau)}$$

At any particular point in time, the amount of sulphur down into kiln at 5 can be said to be roughly equal to the sum of the amount of sulphur which passes in at 7 ($S_{feed}$), 2 ($S_{kiln\ gas}$) and at 3 ($S_{sec.fuel}$), but minus the amount of sulphur which passes out at 4 ($S_{exit\ gas}$). Still, in most kiln systems, the sulphur content in the last-mentioned stream, $S_{exit\ gas}$, will be equal to 0:

$S_{cyc} = S_{feed}(t) + S_{kiln\ gas}(t) + S_{sec.fuel}(t)$ or $S_{kiln\ gas} = S_{cyc}(t) - S_{feed}(t) - S_{sec.fuel}(t)$ This entails that E(t) can be calculated both by measuring the sulphur content in the exit gas from the kiln and by measuring the sulphur content in the material being fed to kiln:

$$E(t) = \frac{S_{kiln\ gas}(t) - S_{prim.fuel}}{S_{feed}(t-\tau) + S_{kiln\ gas}(t-\tau) + S_{sec.fuel}(t-\tau)} \quad (A)$$

or $$E(t) = \frac{S_{cyc}(t) - S_{feed}(t) - S_{sec.fuel}(t)}{S_{cyc}(t-\tau)} \quad (B)$$

These two expressions will only be valid when the kiln is a rotary kiln but similar expressions can be developed for other kilns, e.g. stationary kilns.

Generally, there is no point in fitting an $SO_2$-meter in the exit gas duct from the rotary kiln. This is because the emission of the kiln system into the atmosphere of this detrimental gas component is not in any way related to the measured value of $S_{kiln\ gas}$ due to the almost 100% absorption efficiency of $SO_2$ in the lower preheater stage or in the calciner where a relatively large air surplus exists.

Generally, it is uncomplicated to assess the contributions which the raw materials and fuel give to the amount of sulphur on the basis of the current analyses and the dosage of feed input.

E(t) can then be calculated, either on the basis of (A) based on measurements of the $SO_2$ content in the kiln exit gas, $S_{kiln\ gas}$, or based on (B) if the sulphur content is measured in the stream which passes from the separation cyclone after the calciner and down into the kiln, $S_{cyc}$.

Since $SO_2$ is the only sulphureous component at a high temperature and air surplus, the easiest method for measuring $S_{kiln\ gas}$ is to install an $SO_2$-meter, which continuously analyzes the kiln exit gas, in the kiln outlet.

A major source of error associated with this method is that calcined raw meal is whirled up in the exit gas so that the sulphur dioxide is chemically combined through the reaction:

(C) $SO_2 + \frac{1}{2}O_2 + CaO \rightarrow CaSO_4$

If the exit gas sample is cleaned and cooled with water, which is the basic operating principle in certain systems, a part of the $SO_2$ volume may also be bound by the water which is alkaline because of the CaO. As a result hereof, the gas analyzer signal will be too small.

However, if due attention is given to these sources of error, it will often be possible to assume that a fixed fraction of the $SO_2$ volume will disappear, and, accordingly, the signal can still be used for controlling the temperature since the real amount of evaporated $SO_2$ is proportional to the measured amount of $SO_2$, $S_{kiln\ gas.\ measured} = \text{constant} \times S_{kiln\ gas}$.

The method cannot be used for control purposes, if the $SO_2$ stream out of the kiln (e.g. due to a bypass duct being established to reduce $SO_2$ and the chloride circulation in the kiln system) is of a size which is so limited that approximately all the $SO_2$ volume is absorbed by whirled-up CaO. In case of $SO_2$ presence here, this is more an expression of an air deficit in the kiln, cf. equation (C), than of a high burning zone temperature.

The amount of sulphur being fed to the rotary kiln can be determined by several known methods. For example by means of an Outokumpo x-ray analyzer capable of continuously determining the content of the elements Fe, Ca and S in the cyclone material. For this purpose, a substream of raw meal is extracted from the cyclone, cooled down and compacted before it is fed to the analyzer. The signal which is received for the S-content or the S/Ca ratio provides a precise indication of the amount of sulphur that passes down into the rotary kiln.

I claim:

1. A method for controlling the temperature in a kiln for manufacturing cement clinker wherein raw materials are first preheated in a preheater by exhaust gas from the kiln, and thereafter fed into the kiln, and further wherein sulfur circulates between the kiln and the preheater in the form of sulfur dioxide in the exhaust gas from the kiln to the preheater where it is absorbed or adsorbed on basic raw feed material in the preheater and returned to the kiln in a solid state with the raw material, said method further comprising measuring the temperature in the kiln by measuring relative to time (t) the amount of sulfur ($S_{feed}$) in the exhaust gas from the kiln or the amount of sulfur ($S_{cyc}$) in the raw material fed to the kiln so as to obtain an evaporation factor E, the evaporation factor E being the fraction of the sulfur ($S_{cyc}$) that is converted in the kiln to sulfur ($S_{feed}$), said evaporation factor E then being adjusted and maintained within a set range by adjusting the amount of fuel to the kiln.

2. A method according to claim 1, further comprising measuring the sulphur content $S_{kiln\ gas}(t)$ in the exit gas of the kiln.

3. A method according to claim 1, further comprising measuring the sulphur content $S_{cyc}(t)$ in the feed stream of material to the kiln.

4. A method according to any one of claim 1, 2 or 3, wherein the temperature in the burning zone of the kiln is within the range 1100°–1500° C.

5. A method according to any one of claims 1, 2 or 3, wherein the temperature in the burning zone of the kiln is within the range 1100°–1350° C.

6. A method according to any one of claims 1, 2 or 3, wherein the temperature in the burning zone of the kiln is within the range 1275°–1325° C.

7. A plant for manufacturing cement clinker comprising a preheater for preheating cement raw meal, optionally a calciner for calcining the preheated raw meal, and a kiln for burning the preheated and optionally calcined raw meal, and wherein the temperature in the kiln is adjusted by varying the fuel rate to the kiln and wherein a meter is fitted between the kiln and the preheater for measuring relative to time (t) the amount of sulfur ($S_{feed}$) in the exhaust gas from the kiln or the amount of sulfur ($S_{cyc}$) in the raw material fed to the kiln so as to obtain an evaporation factor E, the evaporation factor E being the fraction of the sulfur ($S_{cyc}$) that is converted in the kiln to sulfur ($S_{feed}$), said evaporation factor E then being adjusted and maintained within a set range by adjusting the amount of fuel to the kiln.

8. A plant according to claim 7 wherein the meter is located in the exit gas duct of the kiln.

9. A plant according to claim 7, wherein the meter is located in the feed stream duct to kiln.

\* \* \* \* \*